(12) United States Patent
Hamperl et al.

(10) Patent No.: US 8,562,479 B2
(45) Date of Patent: Oct. 22, 2013

(54) TANDEM AXLE HAVING TWO DRIVABLE AXLES AND A DRIVETRAIN WHICH CAN BE PARTIALLY DISCONNECTED

(75) Inventors: Johann Hamperl, Esslingen (DE); Michael Helfrich, Leutenbach (DE); Uwe Mierisch, Baunatal (DE); Ferdinand Mulzer, Stuttgart (DE)

(73) Assignee: Daimler AG, Stuttgart (DE)

( * ) Notice: Subject to any disclaimer, the term of this patent is extended or adjusted under 35 U.S.C. 154(b) by 527 days.

(21) Appl. No.: 12/377,365

(22) PCT Filed: Aug. 1, 2007

(86) PCT No.: PCT/EP2007/006797
§ 371 (c)(1),
(2), (4) Date: May 28, 2010

(87) PCT Pub. No.: WO2008/019759
PCT Pub. Date: Feb. 21, 2008

(65) Prior Publication Data
US 2010/0248888 A1 Sep. 30, 2010

(30) Foreign Application Priority Data

Aug. 17, 2006 (DE) .......................... 10 2006 038 520
Sep. 23, 2006 (DE) .......................... 10 2006 045 007

(51) Int. Cl.
*F16H 48/06* (2006.01)
(52) U.S. Cl.
USPC .......................................................... 475/221
(58) Field of Classification Search
USPC .......... 475/221, 222, 200, 203; 180/233, 247;
74/665 F, 665 G
See application file for complete search history.

(56) References Cited

U.S. PATENT DOCUMENTS 4,821,604 A * 4/1989 Asano .............................. 74/718
5,056,640 A * 10/1991 Yamamoto et al. ........ 192/85.02
(Continued)

FOREIGN PATENT DOCUMENTS

DE 39 12 172 A1 10/1989
DE 197 23 324 A1 12/1998
(Continued)

OTHER PUBLICATIONS

International Search report dated Nov. 27, 2007 with partial English translation (Eight (8) pages).

(Continued)

*Primary Examiner* — David D Le
*Assistant Examiner* — David J Hlavka
(74) *Attorney, Agent, or Firm* — Crowell & Moring LLP (57) ABSTRACT

A tandem axle having two drivable axles, each axle including a differential gearing with a drive input gearwheel, drivable by a shaft, as a differential gearing input and with two drive input semi-axles driving the wheels of the axle using axle shaft wheels. The wheels of the first axle are permanently positively coupled to the drive input gearwheel of the axle. An activatable distributor wheel is seated on a drive input shaft of the drive input gearwheel of the first axle. The distributor wheel meshes with a through drive shaft wheel which is arranged in a rotationally rigid fashion on a through drive shaft. The output of the through drive shaft is coupled to the input-side drive input gearwheel of the second axle by means of intermediate members. Switchable clutches are arranged in the second axle between the axle shaft wheels and their adjacent wheels.

11 Claims, 5 Drawing Sheets

(56) References Cited

U.S. PATENT DOCUMENTS

| | | | |
|---|---|---|---|
| 5,119,900 A * | 6/1992 | Watanabe et al. | 180/245 |
| 5,135,071 A * | 8/1992 | Shibahata et al. | 180/249 |
| 5,141,072 A * | 8/1992 | Shibahata | 180/245 |
| 5,219,038 A * | 6/1993 | Hamada et al. | 180/248 |
| 6,108,601 A | 8/2000 | Breithor et al. | |
| 6,386,348 B1 * | 5/2002 | Kunii | 192/35 |
| 2005/0266953 A1 * | 12/2005 | Puiu | 475/205 |

FOREIGN PATENT DOCUMENTS

| | | |
|---|---|---|
| GB | 820103 | 9/1959 |
| GB | 2 221 272 A | 1/1990 |
| JP | 57-109361 | 7/1982 |
| JP | 58-80326 | 5/1983 |
| JP | 59-186544 | 12/1984 |
| JP | 2-164619 A | 6/1990 |
| JP | 8-337125 A | 12/1996 |
| JP | 2000-326742 | 11/2000 |
| JP | 2004-359132 A | 12/2004 |
| WO | WO 02/46030 A1 | 6/2002 |
| WO | WO 2005/110799 A1 | 11/2005 |

OTHER PUBLICATIONS

Written Report of the International Search Agency with partial English translation (Eleven (11) pages).

* cited by examiner

TANDEM AXLE HAVING TWO DRIVABLE AXLES AND A DRIVETRAIN WHICH CAN BE PARTIALLY DISCONNECTED

CROSS REFERENCE TO RELATED APPLICATIONS

This application is a national stage of PCT International Application No. PCT/EP2007/006797, filed Aug. 1, 2007, which claims priority under 35 U.S.C. §119 to German Patent Application Nos. 10 2006 038 520.9, filed Aug. 17, 2006, and 10 2006 045 007.8, filed Sep. 23, 2006, the entire disclosures of which are herein expressly incorporated by reference.

BACKGROUND AND SUMMARY OF THE INVENTION

The invention relates to a tandem axle having two drivable axles, wherein each axle comprises a differential with a drive gearwheel, which can be driven by a shaft, as differential input, and two drive half-shafts, which drive the wheels on this axle by way of axle shaft gears.

DE 39 12 172 A1 discloses a vehicle four-wheel drive, the drive system of which comprises an engine, a manual shift transmission, two front wheels driven directly by said transmission and two selectively engageable rear wheels. A drivetrain comprising a prop shaft, a differential and two drive half-shafts is arranged between the rear wheels and the manual shift transmission. The rear wheels are each driven by way of a freewheel clutch, provided that when the prop shaft is engaged, the clutch arranged between the respective freewheel clutch and the drive half-shafts is closed.

The present invention provides a tandem axle equipped with two drivable axles, which will help to cut the fuel consumption of the vehicle and to reduce the tire wear on the axle.

This is achieved by a tandem axle having two drivable axles, each axle comprising a differential with a drive gearwheel that can be driven by a shaft as a differential input and two drive half shafts that drive the wheels of this axle by way of axle shift gear. Here the wheels of the first axle are permanently and positively coupled to the drive gearwheel on this axle. The drive gearwheel on the first axle has a drive shaft on which a selectively engageable transfer gear is seated. The transfer gear meshes with a drive-through shaft gear, arranged rotationally locked on a drive-through shaft. The output of the drive-through shaft is coupled by way of intermediate members to the input-side drive gear wheel on the second axle. Shifting clutches are arranged in the second axle between the axle shaft gears and their adjacent wheels.

In conventional tandem axles the entire torque delivered by the drive is transmitted to the road surface via two axles, regardless of whether the torque is required or not. The full torque is often only needed when driving off or in uphill driving. Apart from the latter operating state it will generally suffice to transmit a reduced torque via just the first of the two axles, for example. In order to provide the full torque for these situations, an automated clutch, for example, may control or regulate the separation and restoration of the power flow between the first and the second axle.

Disconnecting an entire axle, as necessary, including the shutdown of the drivetrain between the first axle and the wheels of the second axle, affords a measurable saving in running costs. The trailing of the second axle serves to reduce the fuel consumption and the tire wear, together with the mechanical wear of all gearwheels and joints involved in driving this axle. There are furthermore no splash losses in the differential of the second axle.

Other objects, advantages and novel features of the present invention will become apparent from the following detailed description of one or more preferred embodiments when considered in conjunction with the accompanying drawings.

BRIEF DESCRIPTION OF THE DRAWING FIGURES

Further details of the invention are set forth in the following description of an embodiment represented in the drawings, in which.

DETAILED DESCRIPTION

Figure 1:
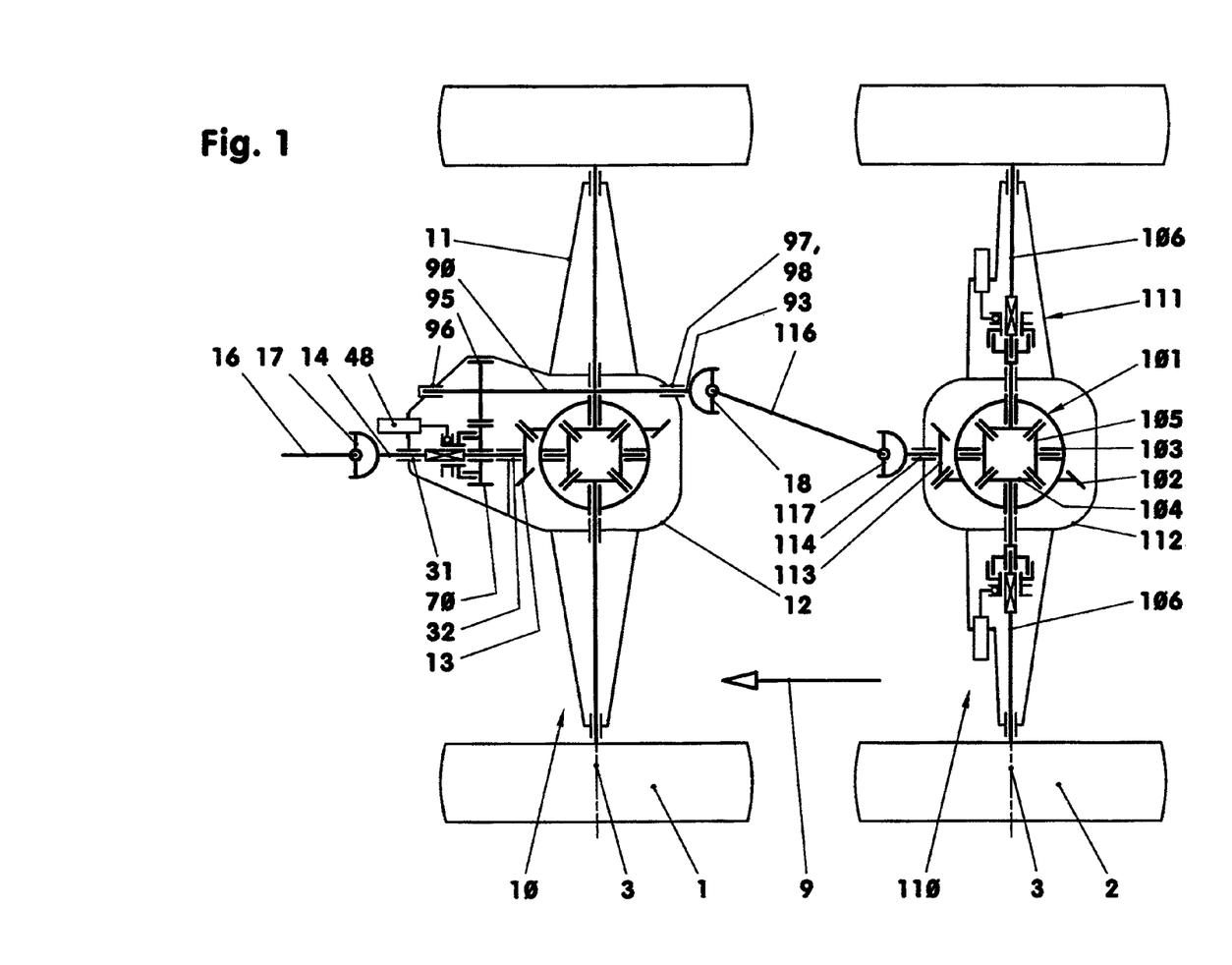
FIG. 1 shows a drivetrain of a tandem axle, both axles being driven.
Figure 2:
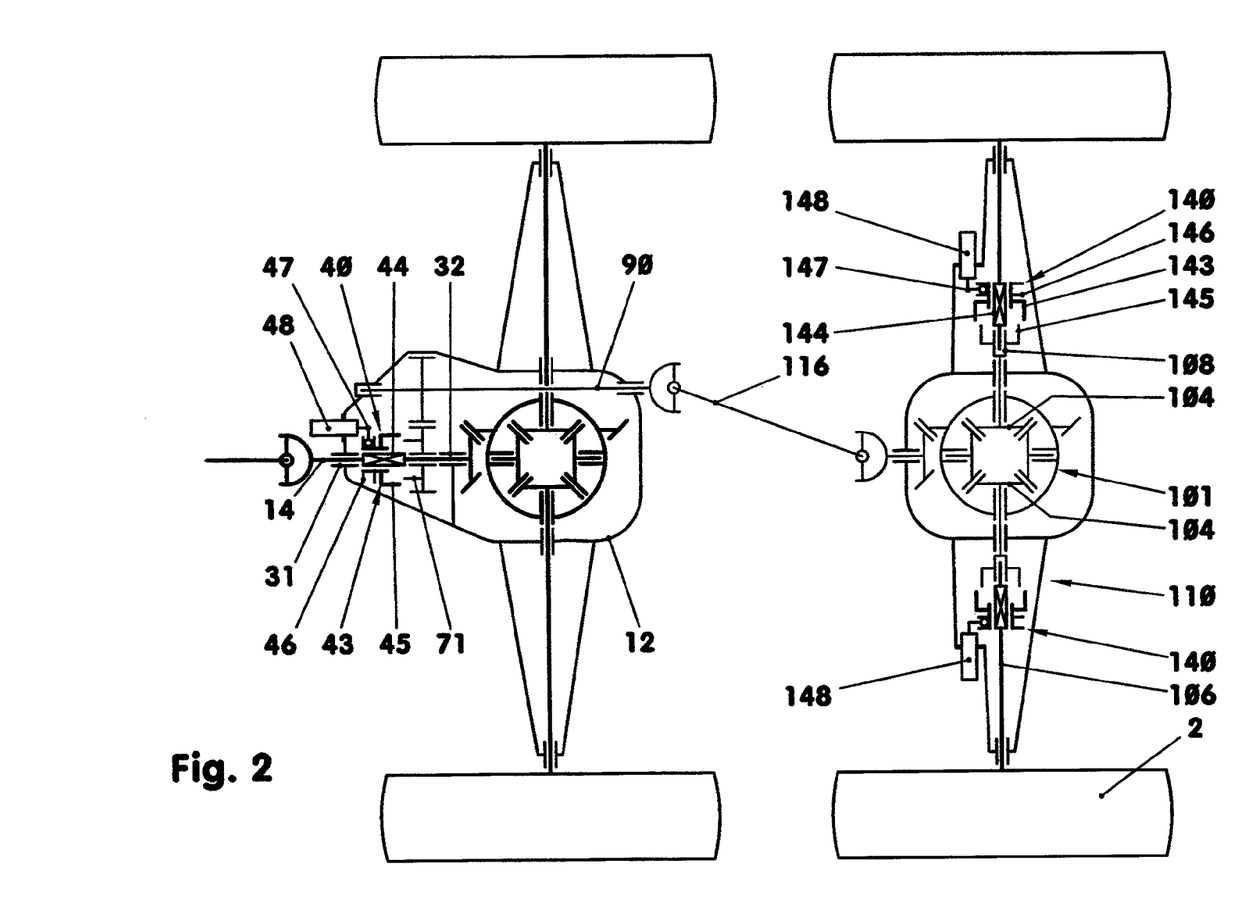
FIG. 2 shows the same as FIG. 1, but the second axle is disconnected from the drivetrain. The differential gears and the drive-through shaft do not rotate.

FIGS. 1 and 2 in a symbolic representation show a top view of the rear part of the drivetrain of a tandem axle of a semitrailer truck tractor. The tandem axle has a first, front axle (10) and a second, rear axle (110). Both axles (10, 110) are here represented as rigid axles merely by way of example.

The final drive (101) of the individual axle (10, 110) is in each case supported in an axle beam (11, 111). At the same time a differential housing (12, 112) is arranged in the central area of the axle beam (11, 111). As transmission input the individual differential housing (12, 112) has a bevel drive pinion (13), the center line (15) of which runs at least approximately parallel to direction of travel (9). The latter meshes with a ring gear (102), which is arranged on a differential case (103) and the center line of which is the wheel axis of rotation (3). Multiple differential bevel gears (105) are supported in the differential case (103). Their center lines lie in a plane, which is oriented perpendicular to the wheel axis of rotation (3). The center lines of the differential bevel gears (105) intersect one another on the wheel axis of rotation (3). The differential bevel gears (105) mesh with the axle shaft gears (104), which are supported in the axle beam (11, 111) and rotationally locked to the drive half-shafts (106). The drive half-shafts (106) drive the wheels (1, 2).

The bevel drive pinions (13, 113) of the individual axles (10, 110) are driven by prop shafts (16, 116) by way of articulated shaft joints (17, 117).

According to FIGS. 1 and 2 the differential housing (12) of the front axle (10) is of enlarged design. A selectively engageable drive-through shaft (90) is additionally supported in this housing (12). For this purpose the drive shaft (14) of the bevel drive pinion (13), supported in two bearing points (31, 32) in the housing (12), is of longitudinally extended design. A mechanical clutch (40) and a transfer gear (70) are seated on the drive shaft (14) between the two bearing points (31) and (32).

The transfer gear (70) is, for example, a helical gear, which meshes permanently with a drive-through shaft gear (95) rigidly arranged on the drive-through shaft (90). On the left, next to the transfer gear (70), is the remotely shifted, positively interlocking clutch (40), cf. FIGS. 1 and 2. The clutch (40) comprises a gearshift sleeve (43), longitudinally displaceable via a shift fork (47). The gearshift sleeve (43) is seated by way of a positively interlocking shaft-hub connection (44) between the two bearing points (31) and (32). The shaft-hub connection (44) is, for example, a spring connection, a splined shaft connection or a toothed shaft connection. In the coupled state, cf. FIG. 1, the gearshift sleeve (43) meshes by means of an internal toothing (45) in an external toothing (71) laterally arranged on the transfer gear (70). On the left, next to the internal toothing (45), the gearshift sleeve (43) has a shift slot (46), in which a shift fork (47) driven by an actuating element (48) engages, cf. also FIG. 2.

According to FIGS. 1 and 2 the gearshift sleeve (43) can be shifted only when stationary or when the clutch parts, consisting of the gearshift sleeve (43) and the transfer gear (70), are running synchronously. In order to bring about synchronous running while a commercial vehicle is in motion, a synchromesh device, with locking teeth according to the Borg-Warner or Porsche system, for example, may be connected between the gearshift sleeve (43) and the transfer gear (70).

The actuating element (48) may be an electromechanical, electromagnetic, hydraulic or pneumatic drive, for example.

The drive-through shaft (90) is arranged in the differential housing (12), supported on roller bearings at two bearing points (96) and (97, 98), for example. The shaft end (93) protrudes in the area of the rear end face of the differential housing (12). The shaft end (93) or the output of the drive-through shaft (90) and the front shaft end of the drive shaft (114) of the second axle (110) are connected together by intermediate members. These intermediate members are a prop shaft (116) and two universal joints (18, 117). The prop shaft (116) is situated in a Z-shaped arrangement together with the universal joints (18, 117).

FIG. 1 shows the entire torque-loaded drivetrain with a bolder line thickness. This here serves to drive the wheels (1, 2) of both axles (10, 110).

According to FIG. 2 the gearshift sleeve (43) does not engage in the transfer gear (70). Consequently the drive shaft (14) does not transmit any torque to the transfer gear (70). The drive-through shaft (90), represented by a thinner line, and the second axle (110) are not driven. The clutches (140) arranged on the second axle are disengaged simultaneously or with a time lag. The clutches (140) seated between the wheels (2) and the axle shaft gears (104) are similar to the clutch (40) in their construction and function. The gearshift sleeves (143) are supported by a positively interlocking shaft-hub connection (144) on the respective drive half-shafts (106). In the coupled state, cf. also FIG. 1, the gearshift sleeves (143) mesh in the toothing systems (145). The latter are seated, for example formed, on the sections of the drive half-shafts (106), which carry the rotationally fixed axle shaft gears (104).

In the exemplary embodiment according to FIGS. 1 and 2, the respective wheel-side section of the drive half-shaft (106) is guided by needle bearings in an end-face bore (108) in the differential-side section of the drive half-shaft (106).

For shifting the clutches (140), two actuating elements (148) are here arranged in the axle beam (111). Each clutch (140) requires at least one actuating element (148). Both clutches may also possibly be actuated by one actuating element.

The actuating elements act on the gearshift sleeves (143) by way of shift forks (147). For this purpose the shift forks (147) engage in the shift slots (146) in the gearshift sleeves (143). Reference should be made to the details of the clutch (40) with regard to the synchronization.

The two clutches (140) of the axle (110) may be of identical design construction.

The disengagement of the clutches (140) separates that part of the drivetrain comprising the transfer gear (70), the drive-through shaft (90), the prop shaft (116) and the differential (101) entirely from the rotational movement of the undriven, rolling wheels (2), so that it rapidly comes to a standstill due, among other things, to the flow resistances of the oil sump lubrication.

All bearing points for the shafts and gearwheels used in the final drive assemblies are symbolically represented as slide bearings merely for the sake of simplicity. Most bearing points in the ordinary designs are naturally embodied as roller bearings.

Figure 3:
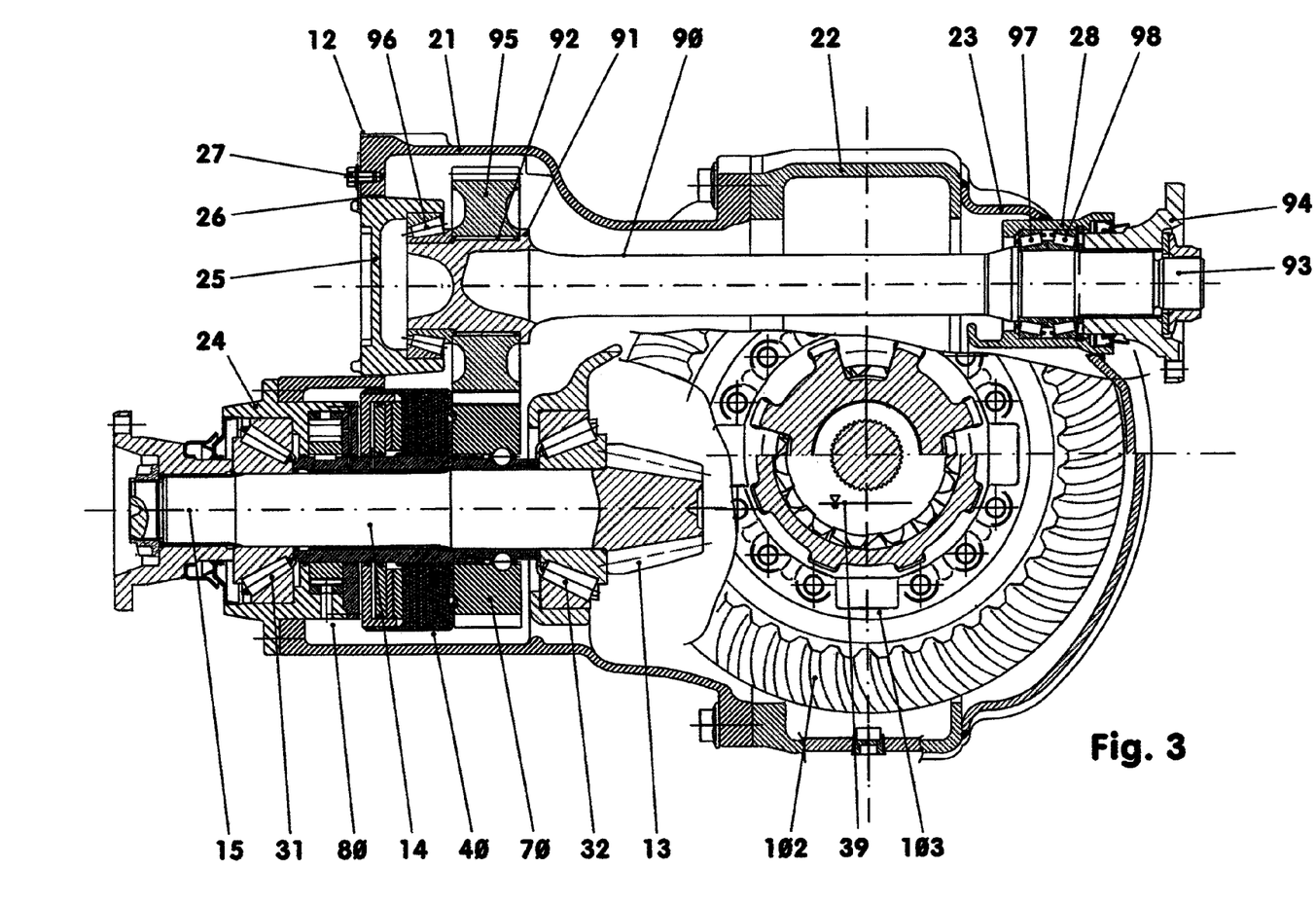
FIG. 3 shows a multiple offset cross section through the axle beam on a level with the differential.

FIG. 3 shows a multiple offset longitudinal section through the differential housing (12) of the axle beam of the front axle (10). The differential housing (12) in the exemplary embodiment comprises a front housing part (21), a reservoir (22) and a reservoir cover (23). The, for example, cast housing part (21) is bolted to the welded reservoir (22). To the rear, the reservoir (22) is sealed off by the reservoir cover (23) that is welded on. The lubricating oil level (39) lies just above the center line (15) of the drive shaft (14).

The drive shaft (14) with the bevel drive pinion (13) formed on is seated by way of the tapered roller bearings (31, 32) in the front housing part (21). The front tapered roller bearing (31) is for this purpose arranged in a flange cover (24). The bevel drive pinion (13) meshes with the ring gear (102). The latter carries the differential case (103). The drive-through shaft (90) runs above the differential case (103), for example parallel to the drive shaft (14). The drive-through shaft (90) is supported by its front end in a screw-in cover (25). The screw-in cover (25) is seated, for example, in the front housing part (21) by way of a fine thread (26). It carries a tapered roller bearing (96), into the inner race of which the front end of the drive-through shaft (90) is inserted.

The rear shaft end (93) of the drive-through shaft (90) is seated by way of two tapered roller bearings (97, 98), aligned in an X-shaped arrangement and forming the fixed bearing, in a bearing bush (28). The latter is welded into the reservoir cover (23). Fixed to this shaft end (93) is a flange (94) for receiving an articulated shaft joint (18). The drive-through shaft (90) may be embodied as a hollow shaft.

The drive-rough shaft gear (95) is arranged on the front shaft end between a shaft collar (91) and the front tapered roller bearing (96). There it is rotationally locked on the drive-through shaft (90) by a splined shaft connection (92). Alternatively the drive-through shaft gear (95) may also be formed onto the drive-through shaft (90).

Figure 4:
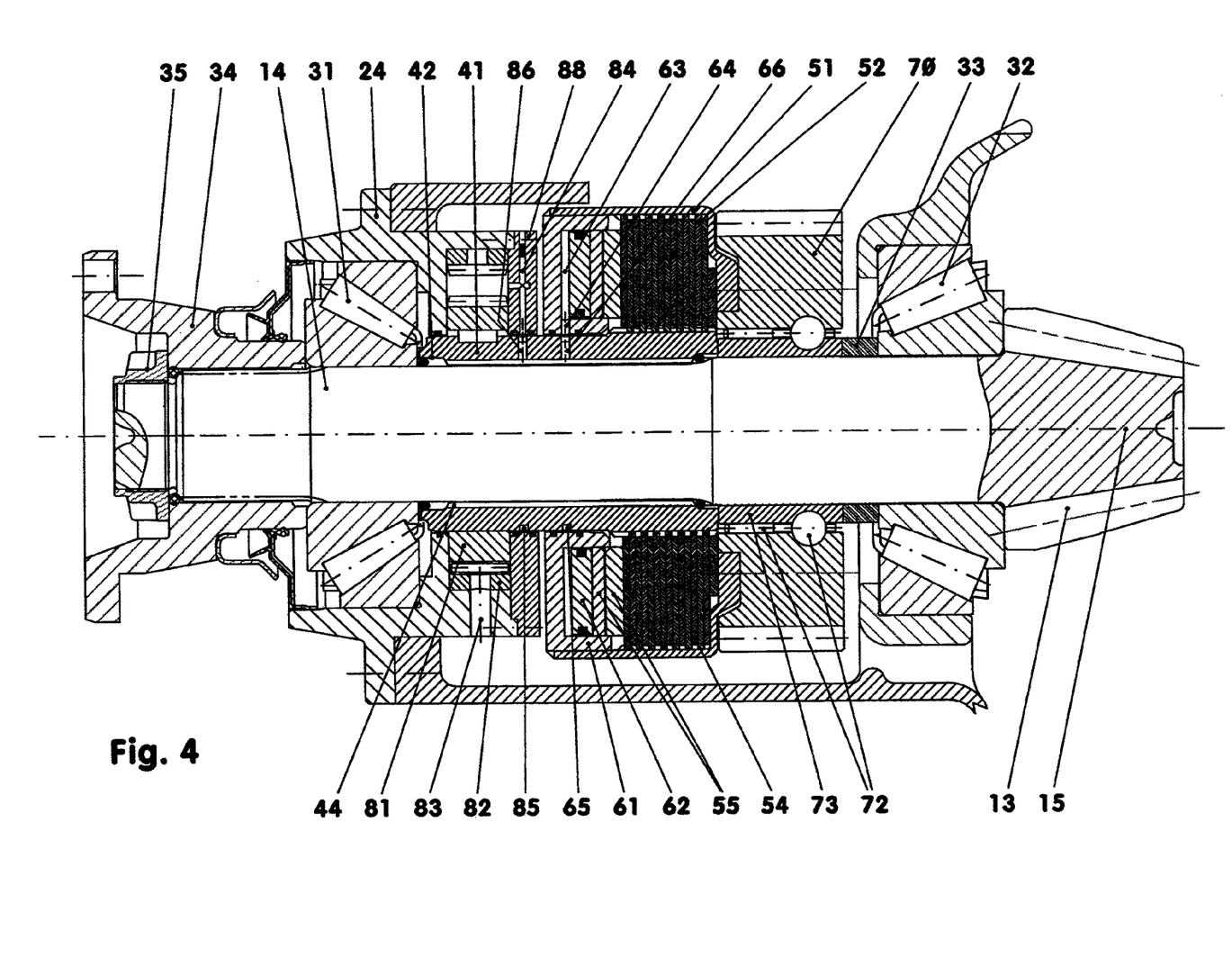
FIG. 4 shows a detail from FIG. 3 with variants.

The drive-through shaft gear (95) meshes with the transfer gear (70) supported on the drive shaft (90), cf. FIG. 4. The transfer gear (70) with its combined needle/roller bearing (72), a friction shifting clutch (40) and an oil pump (80) are arranged between the tapered roller bearings (31, 32) of the drive shaft (14). For this purpose a clutch hub (41), the inner race (73) of the roller bearing (72) and an adjusting washer (33) are clamped between the inner races of the bearings (31, 32). The adjusting washer (33) serves for adjusting the bearing play of the tapered roller bearings (31, 32) in combination with a shaft nut (35) additionally serving to fix the drive flange (34).

The transfer gear (70) is supported directly on the inner race (73). On the left, next to the transfer gear (70), is the splash-lubricated plate clutch (40), which can be engaged and disengaged under load. The outer race (51) of this clutch (40) is bolted to the transfer gear (70). It supports the outer plates (52) so that they are rotationally fixed but axially moveable. The, for example, sinusoidally corrugated inner plates (54) are situated between the outer plates (52). The inner plates (54) are supported so that they are rotationally fixed but axially moveable on the clutch hub (41). An annular cylinder (61) is fixed to the outer race (51). The annular cylinder (61) guides a hydraulically actuated annular piston (62). It has a plurality of radial bores (64), for example, which hydraulically connect the cylinder chamber (63) to the bore (66) in the clutch hub (41). The annular piston (62) acts by way of pressure plates (55) on the plate pack (52, 54).

In the tandem axle drivetrain shown the slipping plate clutch (40) replaces a differential between the first and the second axle.

The oil pump (80) is arranged between the clutch (40) and the tapered roller bearing (31). The pump is a half moon-type gear pump (80), for example, the inner wheel (81) of which is seated, rotationally fixed, on the rotating clutch hub (41). The inner wheel (81) drives the outer wheel (82) embodied as a internal gear. The latter is supported in the flange cover (24), which is here also used as pump housing. The oil drawn in by the pump (80) via the suction bore (83) is delivered via a bore (84) into an annular duct (85). The bore (84) and the annular duct (85) are situated in the cover (88) of the pump (80). The annular duct (85) is connected to the hub bore (42) by way of at least one radial bore (86). Through the assembly joint of the shaft-hub connection (44) or via additional longitudinal ducts the pressurized oil passes by way of further radial bores (66) into the annular duct (65). The oil flows via this annular duct (65) into the cylinder chamber (63). The excess quantity of oil flows via a valve, for example, back into the sump.

If the second axle is to be separated from the force transmission path of the drive train, the pressure side of the pump (80) is relieved via a valve, which is then actuated, into the oil sump.

The cylinder chamber (63) may additionally also be fed with hydraulic oil from another source via a separate hydraulic line (not shown here). This would allow an immediate shifting of the clutch, even before the drivetrain is set in motion.

In an alternative variant, the clutch is kept closed under the load from a mechanical or pneumatic spring or a corresponding spring system. A hydraulic annular cylinder-piston unit, comparable to that in FIG. 4, would then be used to release the clutch (40). In this case both axles (10, 110) would at first always be available when driving off the commercial vehicle.

Figure 5:
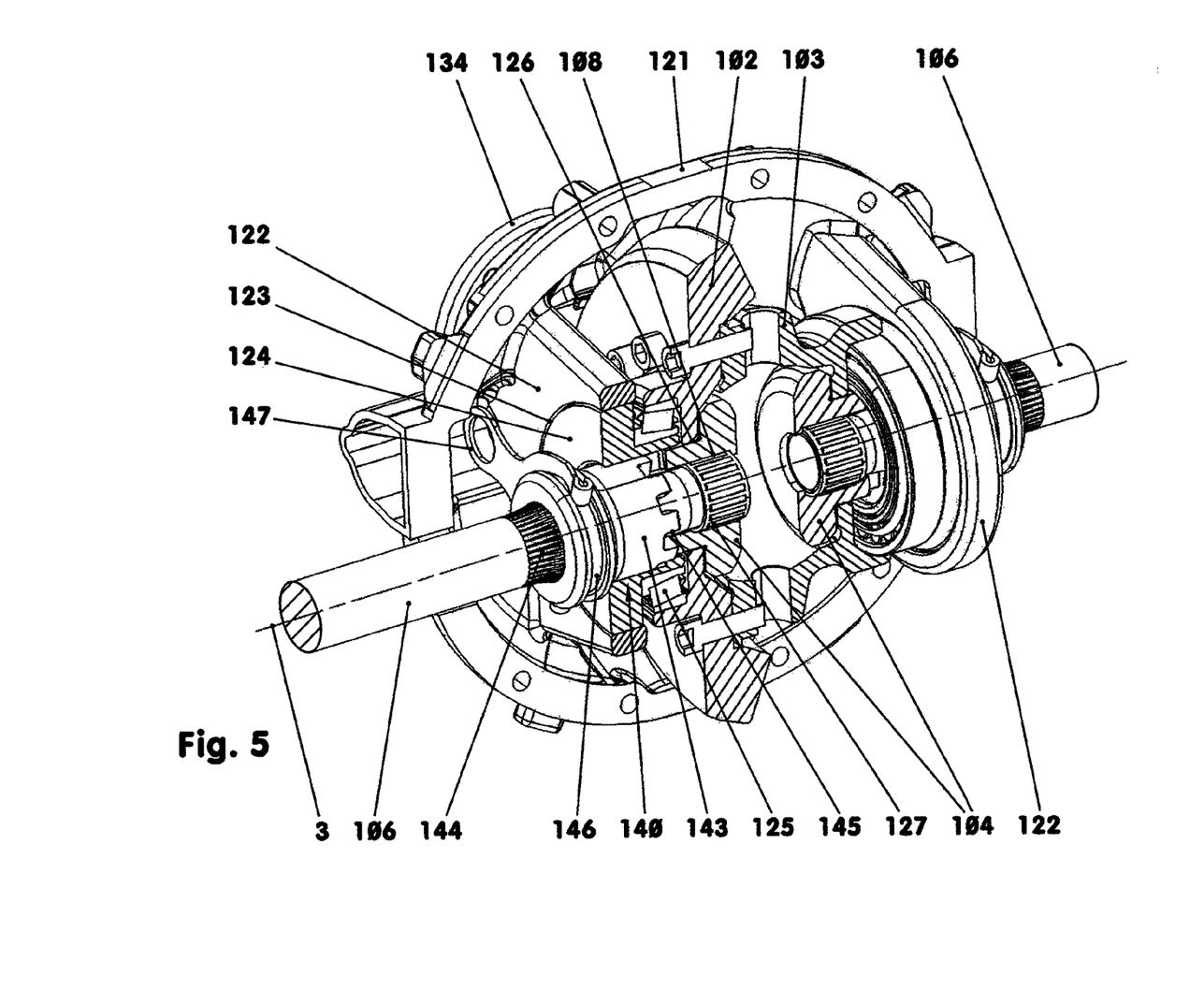
FIG. 5 shows a diametric partial section through a differential with disconnectable axle shaft gears.

In FIG. 5, the front housing part (121) of the differential housing (112) of the second axle (110) is represented diametrically. The housing part (121) has two housing inner webs (122) projecting into the reservoir (not shown here). Both housing inner webs (122) have bores (123) aligning with one another to accommodate flange-like bearing supports (124). The center lines of the bores (123) are situated on the wheel axis of rotation (3), for example. Tapered roller bearings (125) inserted in an O-shaped arrangement are seated on the tubular sections of the bearing supports (124). Said bearings support a combined component, which comprises the ring gear (102) bolted or welded to the differential housing (103).

The combined component (102/103) has two opposing bores (126) aligning with one another, the center lines of which are likewise situated on the wheel axis of rotation (3), for example. The axle shaft gears (104) are supported so that they can slide in these bores (126). The differential bevel gears (105), cf. FIG. 1, and their bearing bolts are not shown here.

The axle shaft gears (104) each have central bores (108). Needle bearings (127) are fitted between the walls of the bores (108) and the—at least in sections—cylindrical end of the drive half-shafts (106), so that at this point the axle shaft gears (104) have no rotationally locked connection to the corresponding drive half-shafts (106).

According to FIG. 5, the rotationally locked connection is achieved by an adjustable claw coupling (140) on each side of the axle. For this purpose, on each side of the axle a gearshift sleeve (143) is seated by way of a shaft-hub connection (144) on the drive half-shaft (106) in immediate proximity to the closest axle shaft gear (104). The adjacent components (104) and (143) have opposing end faces equipped with shift dogs (145).

The gearshift sleeve (143) has a shift slot (146), in which a shift fork (147) engages. The latter is driven by an actuating element (not shown). On actuation of the clutch (140) the shift dogs (145) of the components (104) and (143) latch in one another. The force closure between the drive half-shafts (106) and the axle shaft gear (104) is established by way of the shaft-hub connection (144), the gearshift sleeve (143) and the shift dogs (145).

The selective engagement of the second axle (110) with the additional disconnection of the rear differential can be initiated directly by the driver, through the actuation of an operating control element. It is also possible, however, to control the engagement of the axle (110) automatically. For this purpose, information on the dynamic handling or road surface, such as the vehicle speed, vehicle acceleration, engine speed, accelerator position, road gradient and load condition, for example, may be fed to a control. An evaluation of this information then controls the actuation of the clutches (40) and (140). If driving off, uphill running or the onset of a positive acceleration can be detected from this information, for example, the second axle (110) will be engaged if the load state of the vehicle necessitates this.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A tandem axle, comprising:
first and second drivable axles, each of the first and second drivable axle comprises a differential with a drive gearwheel, which are drivable as differential input by way of a shaft, and two drive half-shafts that drive wheels of the respective axle by way of axle shaft gears,
wherein the wheels on the first axle are permanently and positively coupled to the drive gearwheel,
wherein the drive gearwheel on the first axle meshes with a ring gear, which is arranged on a differential case of the first axle, and the drive gearwheel on the first axle has a drive shaft on which the drive gearwheel is formed and on which a selectively engageable transfer gear is seated,
wherein the transfer gear meshes with a drive-through shaft gear arranged rotationally locked on a drive-through shaft,
wherein an output of the drive-through shaft is coupled to an input-side drive gearwheel on the second axle by way of intermediate members,
wherein shifting clutches are arranged in the second axle between the axle shaft gears and their adjacent wheels, and
wherein the first axle is a forward axle and the second axle is a rear axle.

2. The tandem axle as claimed in claim 1, wherein the drive-through shaft is supported in a differential housing of the first axle.

3. The tandem axle as claimed in claim 2, wherein the drive-through shaft in the differential housing is arranged above the drive shaft.

4. The tandem axle as claimed in claim 1, wherein the transfer gear is supported in a differential housing of the first axle.

5. The tandem axle as claimed in claim 1, wherein the transfer gear is connected to the drive shaft by way of an electromechanically, electromagnetically, hydraulically or pneumatically actuatable clutch.

6. The tandem axle as claimed in claim 5, wherein the clutch is a hydraulically actuated splash-lubricated friction clutch.

7. The tandem axle as claimed in claim 6, wherein the clutch has an oil pump that is directly driven by the drive shaft of the first axle.

8. The tandem axle as claimed in claim 1, wherein the shifting clutches are remotely shifted, positively interlocking clutches.

9. The tandem axle as claimed in claim 8, wherein the shifting clutches are arranged between the respective drive half-shafts and the axle shaft gears.

10. The tandem axle as claimed in claim 1, wherein actuation of the shifting clutches is controllable by electromechanically or electromagnetically actuatable valves.

11. The tandem axle as claimed in claim 10, wherein valves of the shifting clutches are controlled by a computer, wherein the computer controls engagement and disengagement based on data on dynamic handling and road surface.

\* \* \* \* \*